United States Patent [19]

Suggs

[11] 4,047,365

[45] Sept. 13, 1977

[54] AUTOMATIC LEAF SPREADER FOR A TOBACCO HARVESTER

[76] Inventor: Charles W. Suggs, 1507 Trailwood Drive, Raleigh, N.C. 27606

[21] Appl. No.: 607,218

[22] Filed: Aug. 25, 1975

[51] Int. Cl.² .................................................. A01D 45/16
[52] U.S. Cl. ..................................... 56/27.5; 56/16.6; 214/17 C
[58] Field of Search .................. 56/27.5, 344, 16.6; 198/72, 73; 214/17 R, 17 C, 17 CA, 6 D

[56] References Cited

U.S. PATENT DOCUMENTS

| | | | |
|---|---|---|---|
| 3,123,889 | 3/1964 | Watts et al. | 198/73 X |
| 3,698,576 | 10/1972 | Gillette | 214/17 C |
| 3,772,862 | 11/1973 | Wilson | 56/27.5 |
| 3,845,608 | 11/1974 | Lueshen | 56/344 X |
| 3,885,376 | 5/1975 | Johnson | 56/27.5 |

Primary Examiner—Jay N. Eskovitz
Attorney, Agent, or Firm—Larry L. Coats

[57] ABSTRACT

The present invention relates to a tobacco harvester having an automatic leaf spreader associated therewith for uniformly spreading defoliated tobacco leaves into an opened top leaf receiving structure such as a trailer, container, or box-type rack such that the leaf receiving structure is generally uniformly filled throughout from bottom to top by the spreader during the harvesting operation.

6 Claims, 7 Drawing Figures

AUTOMATIC LEAF SPREADER FOR A TOBACCO HARVESTER

The present invention relates to agricultural harvesting machinery, and more particularly to tobacco harvesters.

BACKGROUND OF THE INVENTION

Automatic tobacco harvester of the type shown in U.S. Pat. Nos. 3,841,071 and 3,695,014 are presently extensively used by flue-cured tobacco farmers. Basically, such tobacco harvesters include a leaf defoliating assembly that defoliates certain tobacco leaves from the respective stalks as the harvester moves through the field after which the defoliated tobacco leaves are conveyed from the defoliating assembly to a leaf receiving structure such as a trailer, container or a box-type rack. In conveying the leaves into such a leaf receiving structure, it is well known that the leaves tend to mat together and accumulate in a cone-shaped pile, usually leaving some of the corners and surrounding areas of the leaf receiving structure vacant. Even in cases where the leaf receiving structure is in the form of a trailer and the leaves received therein are later transferred by a hand into single tier conventional racks, the accumulation of leaves in a cone shape is undesirable. Unless the leaves are redistributed uniformly in the trailer or container by a worker stationed adjacent to the trailer or container by hand or some other suitable implement, the capacity of the trailer or container cannot be fully utilized, resulting in more frequent trailer or container exchanges and thereby affecting the efficiency of the tobacco harvester.

At present, many farmers are turning to what is often termed a box-type rack such as disclosed in U.S. patent application Ser. No. 529,490, filed Dec. 4, 1974. Such tobacco racks are directly filled by the tobacco harvester during the harvesting operation, and after filling the leaves are confined within the rack and the same is rotated approximately 90° and placed in a curing and drying structure. To achieve good results with the box-type rack, it is important that the same be uniformly filled throughout. In the past, this has been accomplished by stationing a worker adjacent the rack or container during the harvesting operation and the worker by hand or implement spreading and redistributing the leaves being conveyed into the rack. While this may generally be satisfactory, scarcity of labor has been one, if not the principal, reason for the sudden rush to total mechanization in tobacco farming. Because labor remains scarce and is becoming more so each year, it is desirable to eliminate labor requirements where the required work can be feasibly done mechanically.

SUMMARY OF THE INVENTION

The present invention relates to an automatic tobacco spreader for generally uniformly spreading tobacco leaves into a leaf receiving structure such as a trailer, container or box-type rack. More particularly, the automatic tobacco spreader of the present invention is adapted to operate in conjunction with an automatic tobacco harvester of the type adapted to defoliate leaves from respective stalks and to convey the leaves therefrom into a leaf receiving structure. The spreader, as used in conjunction with an automatic tobacco harvester, is disposed between the conveying means of the harvester and the leaft receiving structure and is adapted to receive the leaves being conveyed by the tobacco harvester and to spread them uniformly into the leaf receiving structure.

The present invention, disclosed herein in the form of two species, is designed to move back and forth over a rectangular shaped opened top forming a part of the leaf receiving structure and to spread the leaves over substantially the entire horizontal cross sectional area of the leaf receiving structure such that the leaf receiving structure such as a box-type rack is filled from bottom to top and the tobacco leaves received therein are generally uniformly distributed throughout the leaf receiving structure. Generally, the spreader or spreading mechanism of the present invention receives the tobacco leaves from the conveying means and the leaves are channeled therefrom through at least one leaf passageway having an exiting opening or area normally disposed over the opened top filling area of the leaf receiving structure. Drive means is provided for driving said spreading mechanism such that the exiting opening or area of the leaf passageway is moved both fore-and-aftly and laterally side to side over the rectangular shaped opened top of said leaf receiving structure so as to result in a leaf spreading pattern path that moves both fore-and-aft and side to side with respect to the opened top of said leaf receiving structure. The drive means is designed to assure that the exiting opening or area of any respective leaf passageway will follow during each traverse a different spreading path (or pattern) relative to the spreading path of the preceding traverse. This results in the leaves being generally uniformly distributed across substantially the entire horizontal cross sectional area of said leaf receiving structure and consequently avoids the problem of conical accumulation in one area of the leaf receiving structure as is presented with a direction stationary filling conveyor.

It is, therefore, an object of the present invention to provide a tobacco leaf spreader that will generally uniformly fill throughout a leaf receiving structure such as a trailer, container or box-type rack from bottom to top.

A further object of the present invention is to provide a tobacco leaf spreader that will operate in conjunction with an automatic tobacco harvester and which will directly uniformly fill an opened top leaf receiving structure operatively associated with said tobacco harvester during the harvesting operation and thereby obviate the requirement of a worker to manually spread the leaves being conveyed into a leaf receiving structure.

Still a further object of the present invention is to provide an automatic leaf spreading mechanism for a tobacco harvester wherein the leaf spreading mechanism is adapted to receive tobacco leaves conveyed thereto and to uniformly spread the tobacco leaves into a leaf receiving structure having a rectangular shaped open top that is normally opened during the harvesting operation.

Another object of the present invention is to provide a leaf spreading mechanism operative in conjunction with an automatic tobacco harvester to move both fore-and-aftly and laterally side to side over a rectangular shaped open top leaf receiving structure wherein tobacco leaves are continuously spread generally uniformly about the horizontal cross sectional area of the leaf receiving structure as generally defined by the rectangular shaped open top thereof.

Another object of the present invention is to provide a leaf spreading mechanism for a tobacco harvester that is adapted to move in both the fore-and-aft and lateral side to side directions over a rectangular-shaped open top of a leaf receiving structure that defines a filling area, wherein a certain resulting spreading path or pattern is achieved as the spreader moves from side to side as well as fore-and-aftly relative to the underlying rectangular-shaped filling area of said leaf receiving structure.

A further object of the present invention is to provide a spreading mechanism that is driven such that during portions of the spreading operation the path or pattern of leaf distribution for a single traverse over the filling area is different or nonrepetitive relative to a preceding traverse.

A further object of the present invention is to provide a tobacco leaf spreading mechanism for a tobacco harvester (or simply as a stationary unit) that has the capability to spread tobacco leaves or leaf material in two dimensions in order that the tobacco leaves or leaf material can be spreaded not simply in a single line or direction but can be spreaded both fore-and-aftly and side to side over substantially the entire filling area of a trailer, container, or box-type rack due to the two dimensional spreading capability of the spreading mechanism.

Other objects and advantages of the present invention will become apparent from a study of the following description and the accompanying drawings which are merely illustrative of the present invention.

Figure 1:
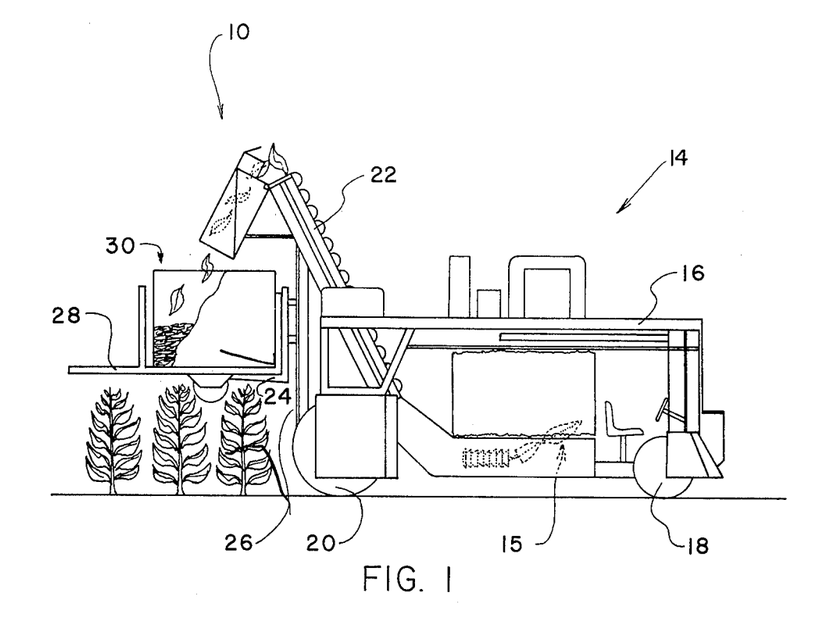
FIG. 1 is a side elevational view of an automatic tobacco harvester having the spreading mechanism of the present invention incorporated therein, the spreading mechanism shown in FIG. 1 being of a first species.
Figure 2:
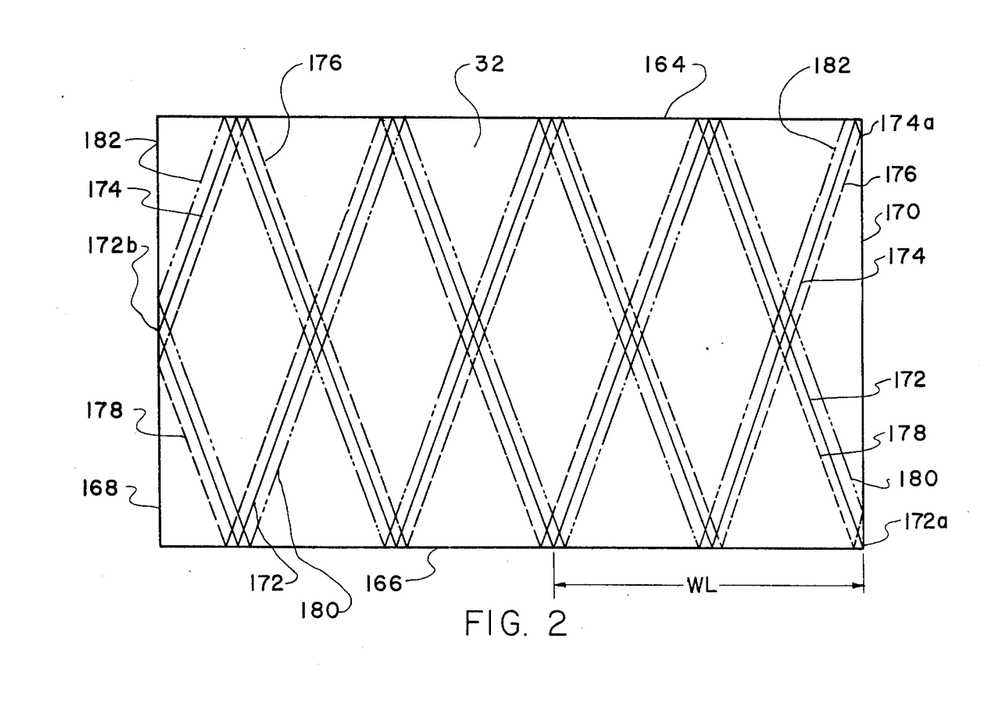
FIG. 2 is a diagrammatic illustration of a certain spreading pattern achieved by a series of traverses made by the spreading mechanism of the present invention.
Figure 3:
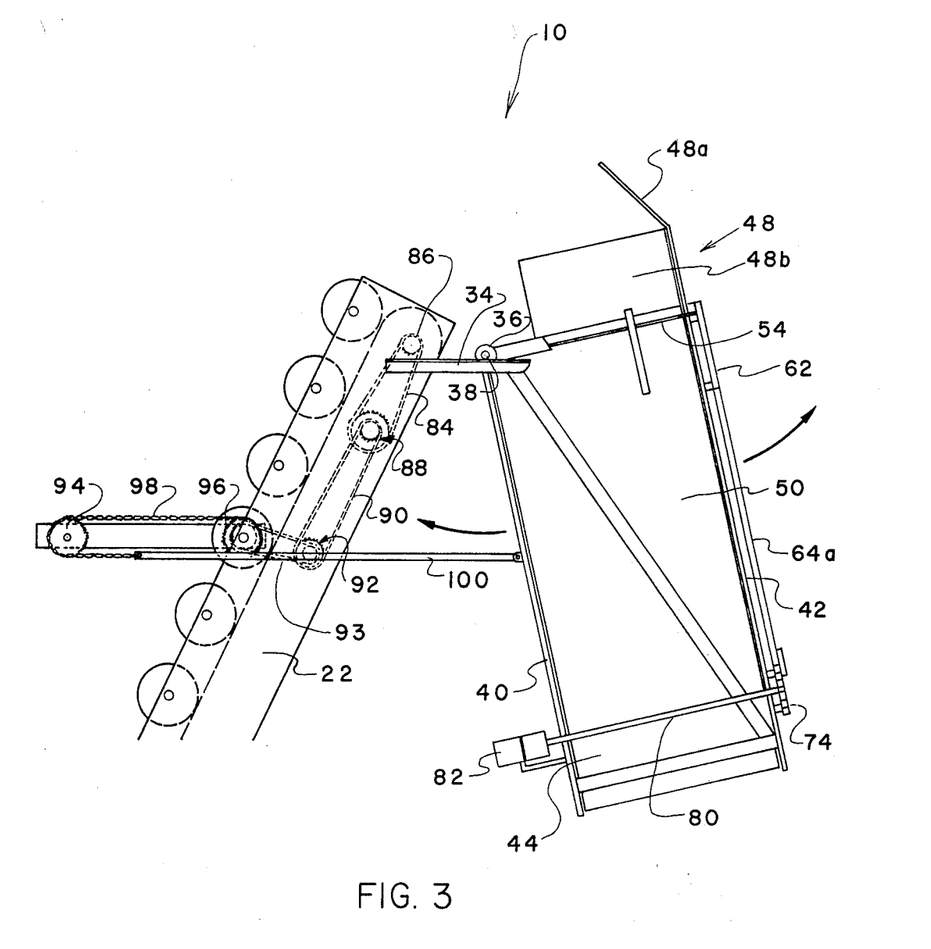
FIG. 3 is a side elevational view of the spreading mechanism of the first species shown mounted generally behind the conveyor system of the automatic tobacco harvester with one of the conveyor assemblies thereof being removed to further illustrate a drive system shown for driving the spreading mechanism fore-and-aftly as viewed in FIG. 3.
Figure 5:
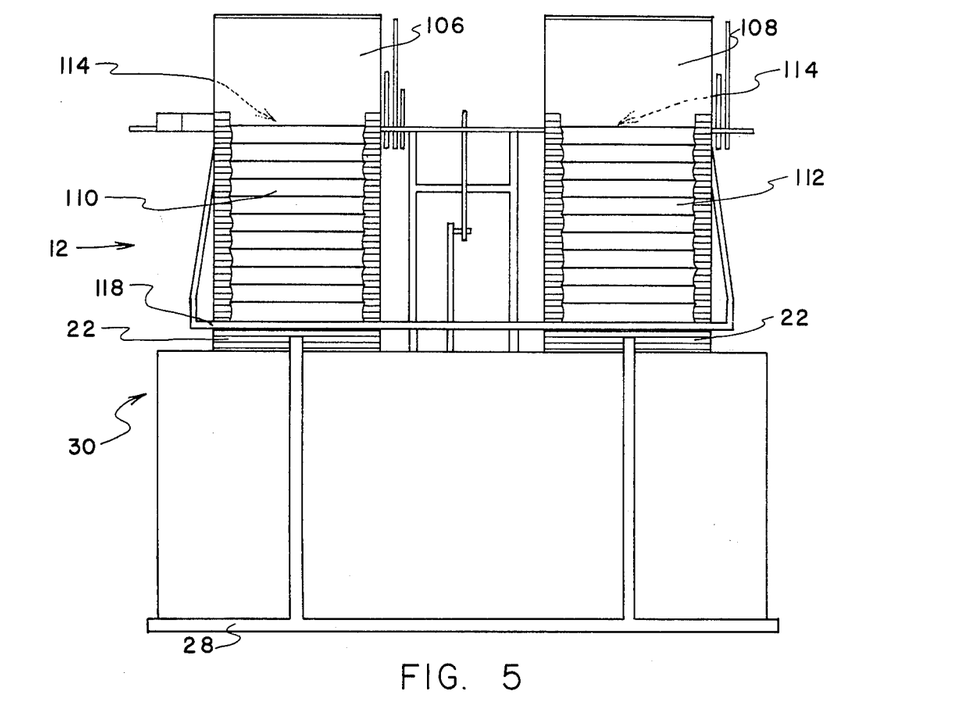
FIG. 5 is a fragmentary rear elevational view of a portion of an automatic tobacco harvester with a spreading mechanism associated therewith of a second species.
Figure 6:
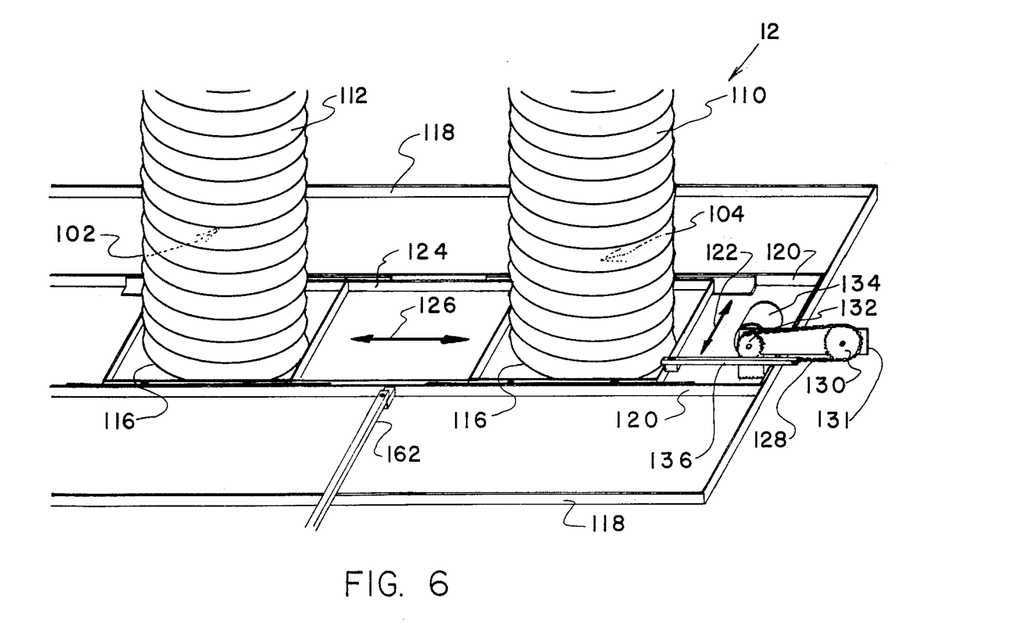
FIG. 6 is a fragmentary perspective view of the spreading mechanism of the second species particularly illustrating a dual directional movable carriage assembly associated therewith.
Figure 7:
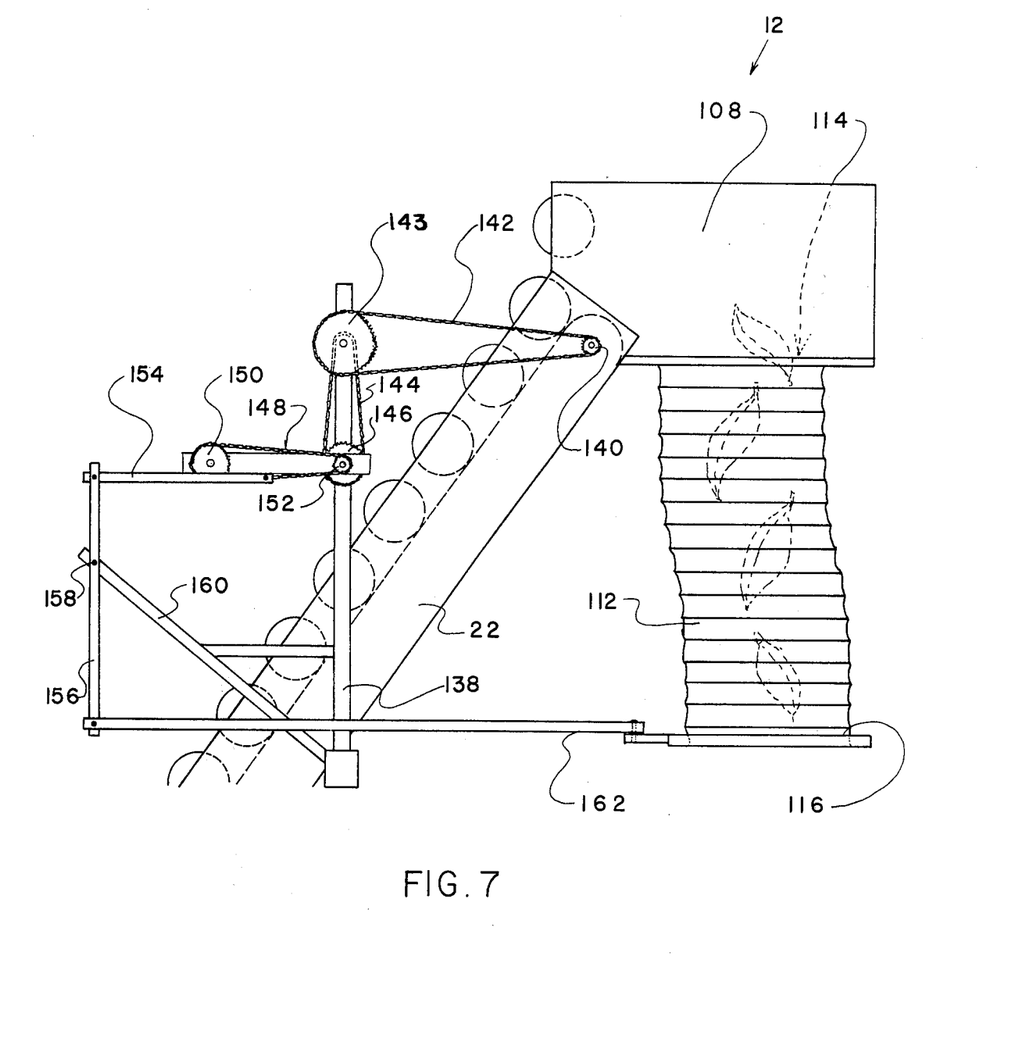
FIG. 7 is a fragmentary side elevational view of the tobacco leaf spreading mechanism of the present invention illustrating a fore-and-aft drive system for the second species shown herein.

With further reference to the drawings, the leaf spreading mechanism of the present invention is shown therein and a first species therefor is indicated generally by the numeral 10 and shown in FIGS. 1, 2 and 3, while a second species is indicated generally by the numeral 12 and shown in FIGS. 5-7. Although the spreading mechanism of the present invention could be utilized as a stationary spreading unit at a place remote from the harvester, such as near the vicinity of one or more curing and drying structures, the present disclosure shows the spreading mechanism operatively connected to a tobacco harvester, indicated generally by the numeral 14, wherein the spreading mechanism is operative to spread leaves into a trailer, container or box-type rack during the actual harvesting operation.

Therefore, it might be beneficial to generally describe the basic components and structure of a conventional tobacco harvester such as that shown in FIG. 1 and indicated generally by the numeral 14. Since such tobacco harvesters are well known and appreciated by those skilled in the art, a detailed discussion of such will not be presented herein. For a detailed and unified understanding of an automatic tobacco harvester of the type shown in FIG. 1, one is referred to the disclosure found in U.S. Pat. No. 3,841,071, the entire subject matter of this patent being expressly incorporated herein by reference.

Now turning to a brief general description of the tobacco harvester 14 shown in FIG. 1, it is seen that the same is of the conventional high clearance type having a main frame 16 supported by front and rear wheels 18 and 20. The harvester 14 further includes conventional defoliating means 15 of the type shown in the above referred to patent, U.S. Pat. No. 3,841,071. As the tobacco harvester 14 traverses the field, the defoliating means 15 operate to defoliate certain tobacco leaves from the respective stalks passing through the harvester 14, the defoliated leaves being transferred onto a main conveyor system 22 that is operative to convey the tobacco leaves from adjacent the defoliating means rearwardly and upwardly therefrom to where the leaves are discharged into the inlet upper end of the spreading mechanism of the present invention. The spreading mechanism is movably mounted adjacent the rear end of said main conveyor 22 and is adapted, as will be discussed in greater detail subsequently herein, to uniformly distribute the tobacco leaves received from the conveyor means into a trailer, container or box-type rack.

In the embodiment shown in FIG. 1, the tobacco harvester 14 includes a fork lift 24 secured to a carriage (not shown) that is movably vertically up and down within a pair of laterally spaced guide rails 26. During the harvesting operation, the fork lift 24 projects underneath a trailer 28 that in turns supports a box-type rack indicated generally by the numeral 30. During harvesting, the fork lift 24 is stationed at an elevated position such that the spreading mechanism is disposed generally above the box-type rack, trailer or container wherein during operation the spreading mechanism traverses over the open top of the particular filling structure whether it be a trailer, container or box-type rack. The filling structure illustrated in the present disclosure is a box-type rack 30 that is directly filled during the harvesting operation, and after being filled and the leaves therein properly confined within the box-type rack, the rack structure is rotated approximately 90° and transferred from the tobacco harvester 14 to a curing and drying structure where the box-type rack is placed within the same for curing and drying. Details of the box-type rack structure are not discussed herein because the structure per se is not material to the present invention except to the extent that the same acts as a tobacco leaf receiving structure having a rectangular or particularly shaped open top that defines a filling area 32 that is normally disposed in operative relationship with the spreading mechanism for receiving tobacco leaves uniformly distributed thereby over substantially the entire cross sectional area of the open top filling area. For a detail understanding and appreciation of the box-type rack 30, one is referred to the disclosure of the present applicant found in U.S. patent application Ser. No. 539,490, filed Dec. 4, 1974, the disclosure of this commonly owned patent application being expressly incorporated herein by reference. Moreover, the box-type rack disclosed in the incorporated pending patent application just referred to is presently being produced and sold by Harrington Manufacturing Company of Lewiston, North Carolina.

Turning now to a detailed discussion of the spreading mechanism of the present invention and particularly to the embodiment illustrated in FIGS. 1, 2 and 3, it is seen that the spreading mechanism 10 shown therein is mounted transversely across the rear end of the main conveyor means 22 of the tobacco harvester 14. In particularly, at least two support arms 34 are fixed about the rear upper end of the main conveyor means 22 and project therefrom to support rotatable shaft means 38 that are rotatively mounted within bearings 36. The spreading assembly 10 is supported about the shaft means 38 as particularly illustrated in FIG. 3 and rotatable fore-and-aftly there-about over the filling area 32 of the open top box-type rack 30 that during the harvesting operation normally assumes a position therebelow.

Viewing the structure of the spreading assembly 10 in greater detail, it is noted that the same is of an open top and open bottom generally box frame construction including a pair of forward and rearward transversely extending walls 40 and 42, the transverse walls 40 and 42 being closed at opposite ends by end panels 44 and 46.

Disposed about the top portion of the spreading assembly 10 is a shroud assembly 48 that includes a back angle plate 48a and a pair of side plates 48b. Shroud assembly 48 functions as a guide or deflector assembly and as such, tends to prohibit tobacco leaves exiting from the main conveyor means 22 of the harvester 14 from being propelled over or outwardly from the open top of the spreading assembly 10.

In the type of harvester 14 shown herein, the conveyor means 22 comprises a pair of laterally spaced conveyor assemblies in which during the harvesting operation each conveyor assembly functions to convey tobacco leaves into the open top of said spreading assembly 10. To provide for spreading of the leaves being discharged into the open top of said spreading mechanism 10, there is provided a plurality of laterally spaced inner panels that moves from side to side between the transverse walls 40 and 42. In particularly and for the type of harvester shown in FIG. 1, the spreading assembly 10 is provided with a first set of inner panels including panels 50 and 52 rotatively mounted to and rotatable with shafts 54 and 56 that extend generally in a fore-and-aft direction between the respective transverse walls 40 and 42 of the spreading assembly 10. Likewise, about another side portion of the spreading assembly 10, there is provided a second set of inner panel members 58 and 60 that are rotatively mounted about fore-and-aft extending shafts 59 and 61.

Figure 4:
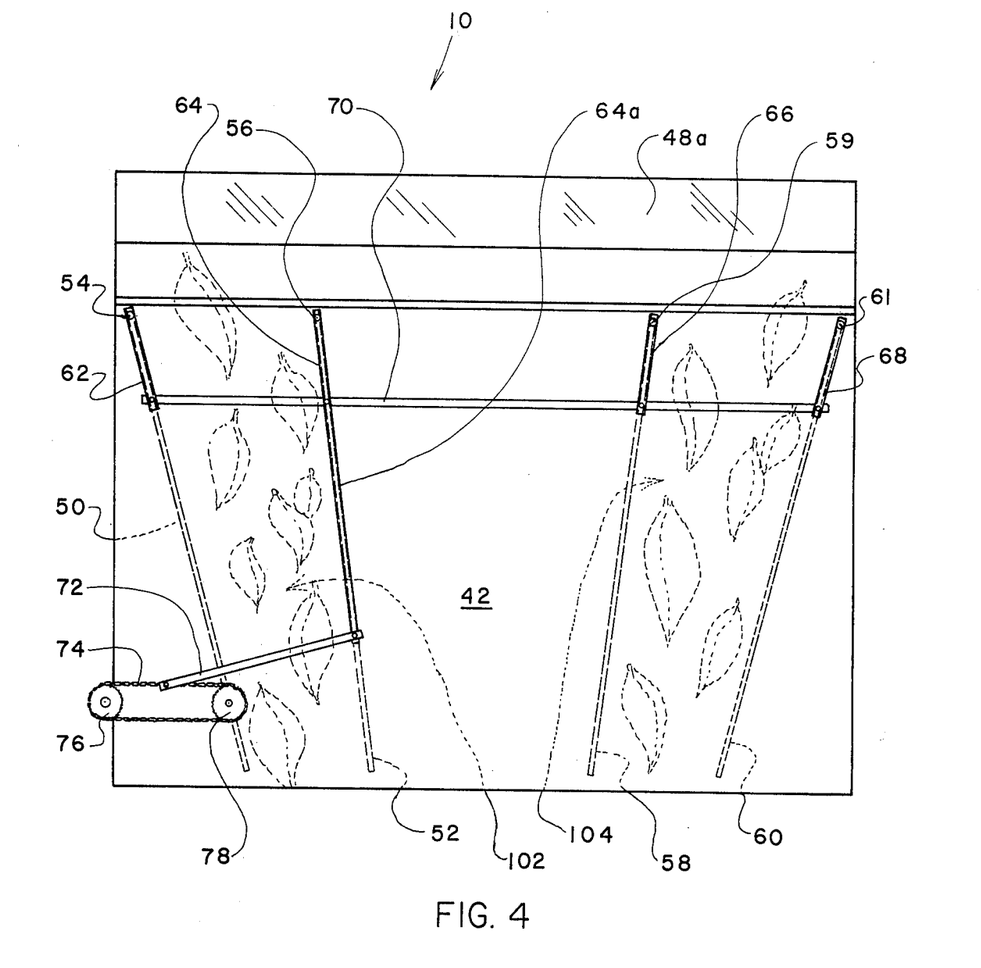
FIG. 4 is a rear elevational view of the spreading mechanism of the first species shown in FIGS. 1 and 3.

From FIGS. 3 and 4, it is seen that the upper or inlet end of the respective planels 50, 52, 58 and 60 are aligned and spaced so as to generally be aligned with a respective conveyor assembly such that the leaves being discharged by a respective conveyor assembly falls within the upper inlet openings between the upper portions of the inner panels of each respective panel set.

Also, it is appreciated that the area bounded by the transverse walls 40 an 42 and the respective inner panels 50, 52, 58 and 60 define a pair of leaf passageways 102 and 104, in the embodiment shown, each respective leaf passageway serving to receive and spread leaves being conveyed into the spreading assembly 10 by a single conveyor assembly. In discussing the leaf passageways 102 and 104, it should be appreciated that each of the respective inner panels extends substantially across the space between the transverse walls 40 and 42 with the respective edges of each terminating in close proximity to the inner side of the respective transverse walls 40 and 42. This allows each of the inner panels 50, 52, 58 and 60 to swing laterally from side to side between the walls 40 and 42, as viewed in FIG. 4, and thereby spread the leaves from side to side as they pass through the respective defined passageways 102 and 104.

Fixed to each of the respective shafts 54, 56, 59 and 61 are a series of lever arms 62, 64, 66, and 68, respectively. Each lever arm is fixed to the rearmost end of the respective shaft exteriorly of the rearmost transverse wall 42 of the spreading mechanism 10 and depends generally downwardly therefrom. In order to actuate each of the inner panels 50, 52, 58 and 60, simultaneously and in unison, there is provided a transverse innerconnecting link 70 pivotably connected to each respective lever arm at a point remote from the point of connection with the respective shaft. From FIG. 4, it is seen that lever arm 64 includes a downwardly projecting extension portion 64a that pivotably connects to an actuating link 72 whose opposite end is pivotably connected to a drive chain 74 trained around a pair of spaced apart sprockets 76 and 78. Sprocket 78 is considered the drive sprocket and is fixed to a drive shaft 80 that extends along side the end panel 44 (as viewed in FIG. 3) and is operatively connected to a conventional driven hydraulic motor 82 that is operatively connected to the hydraulic power system of the tobacco harvester 14. Consequently then, it is seen that as the hydraulic motor 82 is driven the chain 74 is likewise driven in a fashion that results in the innerconnecting link 70 being moved laterally side to side which results in the inner panels 50, 52, 58 and 60 being swung accordingly about their respective shafts. Accordingly, the respective defined leaf passageways 102 and 104 tend to move from side to side between the front and rear transverse wall 40 and 42 of the spreading assembly 10. In particularly, each of the defined leaf passageways 102 and 104 may be said to include an exiting area or discharge end formed about the lower portion thereof and wherein the exiting area or discharge end of the respective leaf passageways move laterally side to side as the hydraulic motor 82 is driven and wherein this side to side movement occurs between the front and rear transverse walls 40 and 42 of the spreading mechanism 10.

In order to achieve two dimensional spreading, the spreading mechanism 10 of the present invention as shown in FIGS. 1, 3 and 4 is provided with a drive system for generally moving the spreading mechanism fore-and-aftly over the filling area and in particularly to pivot the entire spreading assembly shown in FIG. 3 fore-and-aftly about the transverse axis of the shaft means 36 shown therein. Viewing this fore-and-aft drive system in greater detail, it is seen that essentially the drive system comprises a series of chain drive assemblies operatively connected together for driving a main drive chain 98 that is trained around two longitudinally spaced sprockets 94 and 96. More particularly, the illustrated series of chain drives shown in FIG. 3 includes a chain 84 trained around sprocket 86 that is operatively connected to the conveyor means 22 so as to be driven thereby. Through a double sprocket arrangement 88, the driving torque of chain 84 is transferred to a second chain 90 that in turn drives one sprocket of the double sprocket arrangement 92. The driving torque of chain 90 is transferred to a third chain 93 which in turn is operative to drive sprocket 96 and consequently chain 98 trained therearound. Pivotably mounted to a point on chain 98 is a main fore-and-aft connecting drive link 100 that extends generally rearwardly therefrom with the rearmost end being pivotably connected to the exterior side of the forward transverse wall 40 of the spreading assembly 10. Therefore, as the conveyor means 22 is driven, it is seen that through the series of chains just described that the main drive chain 98 is driven around sprockets 94 and 96. As the chain 98 is driven, the main fore-and-aft driving link 100 is moved generally fore-and-aft as the front connecting end thereof cycles with the main drive chain 98. This fore-and-aft movement results in the spreading assembly 10, as shown in FIG. 3 being moved fore-and-aftly over the filling area 32 or the trailer, container or box-type rack 30 disposed thereunder.

Therefore, in the case of the first species of the present invention as shown in FIGS. 1, 3 and 4, it is seen that during the harvesting operation, a two dimensional leaf spreading pattern is achieved due to the fore-and-aft movement of the spreading assembly 10 about the axis of the shaft means 36 and the lateral side to side movement of the inner panels 50, 52, 56 and 58. It is important to appreciate that in the embodiment discussed the side to side movement of the inner panels 50, 52, 58 and 60 occurs simultaneously with the fore-and-aft movement of the complete spreading assembling being driven by the connecting link 100 in FIG. 3. Thus it is seen that when properly mounted and oriented over the filling area 32 of the trailer, container or box-type rack 30, that the spreading mechanism 10 acts to spread the leaves both fore-and-aftly and laterally side to side relative to the open top filling area of the leaf receiving structure and as such, a two dimensional spreading effect is realized.

Now with reference to FIGS. 5–7, a second species for the leaf spreading mechanism of the present invention is shown therein and indicated generally by the numeral 12. Viewing the spreading machanism of the second species in greater detail, it is seen that the same includes a pair of shroud structures 106 and 108 mounted about the rear exiting end of the conveyor assemblies comprising the conveyor means 22 of the tobacco harvester 14. Shroud structures 106 and 108 are peferably fixed to the upper rear frame structure of each respective conveyor assembly so as to receive and deflect the leaves being conveyed by the conveyor assemblies downwardly through a pair of flexible rubber like tubes 110 and 112 in which the upper or inlet end 114 of the respective tubes is fixed or secured to the bottom portions of the shroud structures 106 and 108. Each flexible rubber like tube 110 and 114 is of sufficient cross sectional area to allow the tobacco leaves leaving the conveyor means 22 to cleanly fall therethrough even when the exiting end or discharge area, indicated by the numeral 116, of each respective tube is pulled to a side position substantially out of line with the inlet end 114 of the same respective tube.

Fixed to the tobacco harvester 14 (preferably supported by the conveyor means 22 or frame structure of the harvester 14) is a carriage frame 118 that is disposed generally over the trailer, container or box-type rack 30 when the same is supported in the elevated position as illustrated in FIG. 1. In the case of the rectangular receiving opening 32, the carriage frame 118 is likewise of a rectangular shape and at least of an area comparable to the filling area of the leaf receiving structure and generally disposed thereover such that the carriage frame 118 at least overlie or is generally disposed outside of the boundaries of the same filling area.

In the case of the second species, there is provided a main fore-and-aft carriage 120 that includes rollers associated therewith that move generally fore-and-aftly within the carriage frame 118 in the general direction indicated by the line 122 in FIG. 6. Movably mounted for lateral side to side movement within the main fore-and-aft carriage 120 is a lateral side to side carriage frame 124 that is generally movable in the direction indicated by the line 126. It is appreciated that the lateral side to side carriage 124 includes rollers rotatively mounted thereto and movable along the main fore-and-aft frame 120. The exiting end or discharge area or end 116 of the respective flexible rubber like tubes 110 and 112 are secured to the lateral side to side carriage frame 124 and movable therewith as the same carriage frame moves laterally side to side even while the same carriage frame is being moved fore-and-aftly by the main fore-and-aft carriage frame 120.

Turning now to a description of the drive system for the second species just shown, it is seen that the lateral side to side movement is achieved by a chain 128 trained around respective sprockets 130 and 132 rotatively mounted on member 131 carried by the lateral side to side carriage frame 124. As viewed in FIG. 6, sprocket 132 is operatively driven by a hydraulic motor 134 that is in turn driven by the hydraulic system of the tobacco harvester 14. Interconnecting the chain 128 and the lateral side to side carriage frame 124 is an interconnecting link 136 that drives the side to side carriage 124 within the main fore-and-aft carriage frame 120 as the hydraulic motor 134 is driven.

To achieve the fore-and-aft movement and particularly to drive the fore-and-aft carriage frame 120, there is provided a frame structure generally interposed between the respective conveyor assemblies comprising the conveyor means 22 of the harvester 14 as viewed in FIG. 7. This frame structure includes a vertical post 138 that includes a sprocket 143 that is rotatively driven by chain 142 that is in turn trained around sprocket 140 disposed adjacent the conveyor means 22 and driven thereby. The driving torque of sprocket 143 is transferred to sprocket 146 via chain 144, sprocket 146 being operative to drive sprocket 152. Sprocket 152 has main drive chain 148 trained therearound, main drive chain 148 being further trained around sprocket 150 spaced rearwardly from sprocket 152. To provide the fore-and-aft driving motion, an actuating link 154 includes a forward end pivotably mounted to main drive chain 148 and movable therewith as the main drive chain 148 cycles about sprockets 150 and 152. Actuating link 154 includes another end pivotably connected to an interconnecting link 156 that in turn is pivotably connected to the rear end of a main drive link 162. Main drive link 162 is operatively connected to the main fore-and-aft carriage 120 and is accordingly operative to drive the same fore-and-aftly within the carriage frame 118 as the main chain 148 is driven. It should be pointed out that interconnecting link 156 is pivotably connected by a pivot pin 158 intermediate its ends to a brace 160 that forms a part of the frame structure for supporting the drive system.

Therefore, it is appreciated that as in the case of the first species, the spreading mechanism 12 just described has the ability to receive tobacco leaves from the conveyor means 22 and to spread the leaves into a filling area in two dimensions, i.e., both in the fore-and-aft direction and in a laterally side to side direction.

The two dimensional leaf spreading of the spreading mechanism of the present invention enables tobacco leaves to be uniformly spreaded over substantially the entire cross sectional area of the filling area 32 of a leaf receiving structure, whether it be a trailer, container or box-type rack 30. By spreading in two dimensions, the spreading mechanism is able to spread tobacco leaves both fore-and-aftly and laterally side to side in accordance with a certain desired spreading pattern in which as the spreading mechanism traverses back and forth over a particular spreading area the path of leaf discharge varies sufficient enough that the filling structure is filled from bottom to top generally uniformly throughout the leaf receiving structure. Expressed in another way, it is important that the spreading mechanism not always distribute leaves along the same path during the many traverses of the spreading mechanism that occurs during filling. Variations in spreading path is generally essential during at least some of the traverses during filling if the leaf receiving structure is to be generally uniformly filled throughout, including end, corner, side and middle areas of the leaf receiving structure.

Although various forms of spreading patterns may be chosen such as a sinasoidal wave, a triangular wave or even a rectangular wave, the essential consideration is that the spreading pattern utilized generally uniformly cover a certain portion of the filling area during a series of traverses over that portion of the filling area. Generally, where the area of discharge is smaller than the area being filled, it is generally necessary that there be sufficient variations in the leaf discharge path during the traverses made by the spreading mechanism such that tobacco leaves are generally uniformly distributed over that portion of the filling area in which a particular part of the spreading mechanism is responsible.

Even though various spreading patterns may be used, the present disclosure suggests the use of a triangular wave spreading pattern. For purposes of explanation, one is referred to FIG. 2 which illustrates such a triangular wave spreading pattern for a certain filling area 32, the filling area being the complete open top of a leaf receiving structure or a certain portion thereof. For convenience and efficiency, the spreading mechanism disclosed herein includes two side by side leaf discharge assemblies, but it will be understood that certain applications may require only one leaf discharge assembly while other applications may require two or more depending on the size and type of the leaf receiving structure and the design of the automatic tobacco harvester if the spreading mechanism is utilized therewith.

For purposes of illustration, FIG. 2 diagrammatically illustrates a triangular spreading path of leaf discharge for uniformly spreading tobacco leaves over a certain filling area 32 bonded by fore-and-aft sides 164 and 166 respectively, and left and right sides 168 and 170 respectively. In the way of explanation, line 172 (solid line) represents a right to left traverse across the filling area 32, the line 172 representing the path of discharge of a leaf passageway or leaf discharge structure being moved across that particular filling area. In accordance with the design of the spreading mechanism of the present invention, the spreading mechanism and drive control system therefor is designed such that during operation the particular discharge area is adapted to move both fore-and-aftly between the fore-and-aft sides 164 and 166, and laterally side to side between sides 168 and 170 of the particular filling area 32. With this in mind and as a starting point for explanation, point 172a represents the starting point of a first right to left traverse, and as the spreading mechanism is repeatedly cycled fore-and-aftly between sides 164 and 166 the leaf discharge means therein continues to move laterally right to left until it reaches its leftmost extreme position referred to as point 172b. At point 172b, the spreading mechanism has completed the right to left traverse over the filling area 32 and is now ready to begin a second right to left traverse which is indicated by the solid line 174. Again, during the second right to left traverse as indicated by the line 174, the particular leaf discharge area of the spreading mechanism repeatedly cycles fore-and-aftly between sides 164 and 166 while simultaneously moving laterally right to left until the discharge area reaches its right-most extreme position represented by 174a. After reaching point 174a, the discharge area of the spreading mechanism utilized for spreading over the spreading area 32 of FIG. 2 again traverses (third traverse) right to left (represented by dotted line 176) and after reaching the leftmost side of the filling area, traverses back right to left (fourth traverse) along the dotted line 178. Likewise, upon reaching the right hand extreme side of the filling area 32 as viewed in FIG. 2, the discharge means or structure of the spreading mechanism begins a fifth right to left traverse (line 180 indicated by a long line followed by two dots), and after reaching the left hand side of the filling area 32, the path of the fifth traverse 180 is followed by a sixth right to left traverse that follows along line 182, as viewed in FIG. 2. As previously pointed out, it is desirable that the spreading path be nonrepetitive and in order to assure a non-repetitive spreading path, the wave length, indicated by WL in FIG. 2, is chosen to be of a length not evenly divisible by the length of the sides 164 or 166. This assures that during the spreading operation that the discharge area will not repeatedly reach its extreme right or left side positions when the spreading mechanism is disposed in eigher its fore-and-aft extreme positions. Consequently, it is seen that the spreading path lines are spaced apart although they may extend generally parallel with adjacent spreading lines or paths. It follows that during the course of the filling operation that the discharge area disposed over a particular filling area will move generally uniformly over the entire cross sectional area to be filled during the filling operation. Also, it should be appreciated that the spacing between successive traverse paths may be adjusted such as by adjusting the relative speed of the fore-and-aft and lateral side to side spreading components of the spreading mechanism of the present invention.

In the present disclosure, there is shown various types of drives for driving the spreading mechanism of the present invention both fore-and-aftly and laterally side to side. In some of the embodiments shown, these drive systems are shown to comprise a series of chain drives and interconnecting drive links to effectuate a particular drive. It should be understood and appreciated that such drives are in at least some part provided for the convenience of the particular application, and those skilled in the art will appreciate that such drives may be accomplished and provided for by various other suitable types of drive designs, including more simplified drives such as a hydraulic motor to directly drive the spreading mechanism in either or both directions relative to the underlying filling area.

From the foregoing specification, it is appreciated that the present invention essentially relates to a tobacco leaf spreading mechanism that has the capability to uniformly spread and distribute leaves into an open top trailer, container or box-type rack or the like by providing the spreading mechanism with the capability to spread in two dimensions over the filling area of the leaf receiving structure to be filled. With the two dimensional spreading capability, it is appreciated that various spreading patterns can be achieved and that by particularly designing the drive of the spreading mechanism to yield a certain speed or frequency of movement in a particular direction that the spreading pattern achieved will not be repetitive but will be such that tobacco leaves are generally uniformly distributed over the entire cross sectional filling area of the leaf receiving structure during the filling operation such that the leaf receiving structure is generally uniformly filled from bottom to top.

The terms "upper", "lower", "forward", "rearward", etc., have been used herein merely for the convenience of the foregoing specification and in the appended claims to describe the automatic tobacco leaf spreader for a tobacco harvester and its parts as oriented in the drawings. It is to be understood, however, that these terms are in no way limiting to the invention since the automatic tobacco leaf spreader for a tobacco harvester may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is :

1. A tobacco harvester having an automatic leaf spreading mechanism for generally uniformly spreading and distributinhg harvested tobacco leaves over substantially the entire cross sectional area of a leaf receiving structure, said tobacco harvester comprising:
   a. a frame structure;
   b. defoliating means mounted on said frame structure for defoliating tobacco leaves from respective tobacco stalks during the tobacco harvesting operation as said tobacco harvester moves through the field;
   c. conveying means supported on said frame structure for receiving the defoliated tobacco leaves and for conveying the tobacco leaves from said defoliating means;
   d. a leaf receiving structure normally operatively associated with said tobacco harvester during the harvesting operation for receiving the defoliated leaves, said leaf receiving structure during the harvesting operation having an opened top wherein the receiving structure may be filled by directing tobacco leaves into the top thereof during the harvesting operation;
   e. leaf spreading means operatively interposed between said conveying means and said leaf receiving structure for uniformly spreading the harvested tobacco leaves over substantially the entire horizontal cross sectional area of said leaf receiving structure during the filling operation thereof, said spreading means including means for spreading the leaves both force-and-aftly and laterally side to side relative to the opened top of said leaf receiving structure during the tobacco harvesting operation such that during the filling operation tobacco leaves are uniformly distributed and spread over substantially the entire horizontal cross sectional area of said leaf receiving structure during the tobacco harvested operation;
   f. said leaf spreading means for spreading the leaves both fore-and-aftly and laterally side to side relative to the opened top of said leaf receiving structure including at least one movable leaf passageway having inlet and outlet openings with said inlet opening adapted to receive tobacco leaves leaving said conveying means and wherein the received tobacco leaves move through said leaf passageway and exit the outlet opening therein;
   g. drive means operatively connected to said passageway of said spreading means for moving at least the outlet end thereof in both the fore-and-aft and lateral side to side directions relative to the opened top of said leaf receiving structure during the tobacco harvesting operation; and
   h. wherein said movable passageway comprises a flexible conduit having the inlet end thereof supported and held in a relatively fixed position, and wherein said outlet end is fixed to and movable with a dual directional carriage assembly operatively connected to drive means associated with said spreading means and movable in both the fore-and-aft and lateral side to side directions relative to the opened top of said leaf receiving structure during the tobacco harvesting operation.

2. The tobacco harvester of claim 1 wherein said dual directional carriage assembly is movably mounted in a frame structure supported by said tobacco harvester above the opened top of said leaf receiving structure during the tobacco harvesting operation, and wherein said dual directional carriage assembly includes a first carriage movably mounted within said frame structure for movement in either the fore-and-aft or lateral side to side directions, and a second carriage movably mounted within the first carriage in the other direction perpendicular to the direction of movement of said first carriage.

3. A tobacco harvester having an automatic leaf spreading mechanism for generally uniformly spreading and distributing harvested tobacco leaves over substantially the entire cross sectional area of a leaf receiving structure, said tobacco harvester comprising: a frame structure; defoliating means mounted on said frame structure for defoliating tobacco leaves from respective tobacco stalks during the tobacco harvesting operation as said tobacco harvester moves through the field; conveying means supported on said frame structure for receiving the defoliated tobacco leaves and for conveying the tobacco leaves from said defoliating means; a leaf receiving structure normally operatively associated with said tobacco harvester during the harvesting operation for receiving the defoliated leaves, said leaf receiving structure during the harvesting operation having an open top that defines a filling area wherein said leaf receiving structure may be filled by directing tobacco leaves into the top thereof during the harvesting operation; and a spreading mechanism pivotably mounted on said tobacco harvester above said filling area of said receiving structure, said spreading mechanism including a main spreading assembly having a pair of outer spaced apart extending sides fixed relative to each other so as to define a generally open area therebetween, said main spreading assembly being pivotably mounted and supported about a first axis of rotation wherein the top portion thereof is disposed in close proximity to said conveying means for receiving the defoliated leaves therefrom such that the received defoliated leaves may fall between said spaced apart sides; at least two inner panel means pivotably mounted about respective axes between said outer sides and oriented therein such that said inner panels extend substantially across the entire space between said outer sides so as to form a leaf passageway having upper inlet and lower exiting openings defined by the interior area bounded by portions of said outer sides and the inner spaced apart panel means such that leaves leaving said conveying means may be received by the defined leaf passageway through the inlet opening therein and discharged therefrom through the exiting opening thereof; and drive means for pivoting said main spreading assembly back and forth about said first axis over said filling area of said leaf receiving structure such that the exiting opening within said defined passageway moves across said filling area in a first direction, said drive means further including means for pivoting said inner panel means simultaneously with the driving of said main spreading assembly so as to vary the position of said exiting opening relative to said main spreading assembly such that a resultant tobacco leaf spreading pattern is achieved by the simultaneous movement of said main spreading assembly and the inner panels therein.

4. The tobacco harvester of claim 3 wherein said drive means comprises first and second hydraulic motors that are driven by said tobacco harvester during the harvesting operation; first and second chain drive systems operatively connected to said respective first and second hydraulic motors; a first linkage mechanism operatively connected between said first chain drive system and said main spreading assembly for pivoting said main spreading assembly back and forth about said first axis; and a second linkage mechanism operatively connected between said second chain drive system and said inner panel means for pivoting said inner panel means back and forth about their respective axes as said main spreading assembly is pivotally driven back and forth about said first axis of rotation.

5. A tobacco harvester having an automatic leaf spreading mechanism for generally uniformly spreading and distributing harvested tobacco leaves over substantially the entire cross sectional area of a leaf receiving structure, said tobacco harvester comprising: a frame structure, defoliating means mounted on said frame structure for defoliating tobacco leaves from respective tobacco stalks during the tobacco harvesting operation as said tobacco harvester moves through the field; conveying means supported on said frame structure for receiving the defoliated tobacco leaves and for conveying the tobacco leaves from said defoliating means; a leaf receiving structure normally operatively associated with said tobacco harvester during the harvesting operation for receiving the defoliated leaves, said leaf receiving structure during the harvesting operation having an open top that defines a filling area wherein said leaf receiving structure may be filled by directing tobacco leaves into the top thereof during the harvesting operation; leaf spreading means operatively interposed between said conveying means and said leaf receiving structure for uniformly spreading the harvested tobacco leaves into the opened top leaf receiving structure such that the same may be generally uniformly filled from the bottom to the top during the harvesting operation; said leaf spreading means including a main carriage frame structure disposed over said filling area of said leaf receiving structure and supported in a stationary fashion thereover by said tobacco harvester; a first carriage frame movably mounted on said main carriage frame and movable thereon in a first direction from one side thereof to another over the filling area of said leaf receiving structure disposed therebeneath; carriage means movably mounted on said first carriage frame and movable thereon in a second direction generally perpendicular to the basic direction of said first carriage frame; first drive means operatively connected to said first carriage frame for reciprocally driving said first carriage frame back and forth on said main carriage frame structure; second drive means operatively connected to said carriage means for reciprocally driving the same back and forth on said first carriage frame in a direction generally perpendicular to the basic direction of movement of said first carriage frame; and flexible conduit means supported by said tobacco harvester adjacent said conveying means and including an inlet opening disposed adjacent said conveying means for receiving defoliated tobacco leaves therefrom, said flexible conduit means further including an exiting opening secured to said carriage means and movable there-with for spreading the defoliated tobacco leaves passing through said flexible conduit means into the filling area of said leaf receiving structure as said carriage means moves both with and relative to said first carriage frame.

6. A tobacco harvester having an automatic leaf spreading mechanism for generally uniformly spreading and distributing harvested tobacco leaves over substantially the entire cross sectional area of a leaf receiving structure, said tobacco harvest comprising:
   a. a frame structure;
   b. defoliating means mounted on said frame structure for defoliating tobacco leaves from respective tobacco stalks during the tobacco harvesting operation as said tobacco harvester moves through the field;
   c. conveying means supported on said frame structure for receiving the defoliated tobacco leaves and for conveying the tobacco leaves from said defoliating means;
   d. a leaf receiving structure normally operatively associated with said tobacco harvester during the harvesting operation for receiving the defoliated leaves, said leaf receiving structure during the harvesting operation having an opened top wherein the receiving structure may be filled by directing tobacco leaves into the top thereof during the harvesting operation;
   d. leaf spreading means operatively interposed between said conveying means and said leaf receiving structure for uniformly spreading the harvested tobacco leaves both fore-and-aftly and laterally side to side over substantially the entire horizontal cross sectional area of said leaf receiving structure during the filling operation thereof;

f. said leaf spreading means for spreading the leaves both fore-and-aftly and laterally side to side relative to the opened top said said leaf receiving structure includes at least one movable leaf passageway having inlet and outlet openings with said inlet opening adapted to receive tobacco leaves leaving said conveying means and wherein the received tobacco leaves move through said leaf passageway and exit the outlet opening therein;

g. said fore-and-aftly and laterally side to side movement constitutes first and second directions of movement and wherein said movable passageway comprises a first pair of spaced apart sides movably mounted above the opened top of said leaf receiving area and adapted to move thereacross in a first direction, and a second pair of spaced apart sides pivotably mounted between said first pair of sides and movable independently thereof in a second direction generally perpendicular to said first direction such that during the spreading operation the area bounded by the first and second pair of sides define the leaf passageway; and h. drive means operatively connected to said leaf spreading means for simultaneously driving said first and second pair of sides so as to give rise to a fore-and-aft and lateral side-by-side leaf spreading pattern.

* * * * *